UNITED STATES PATENT OFFICE.

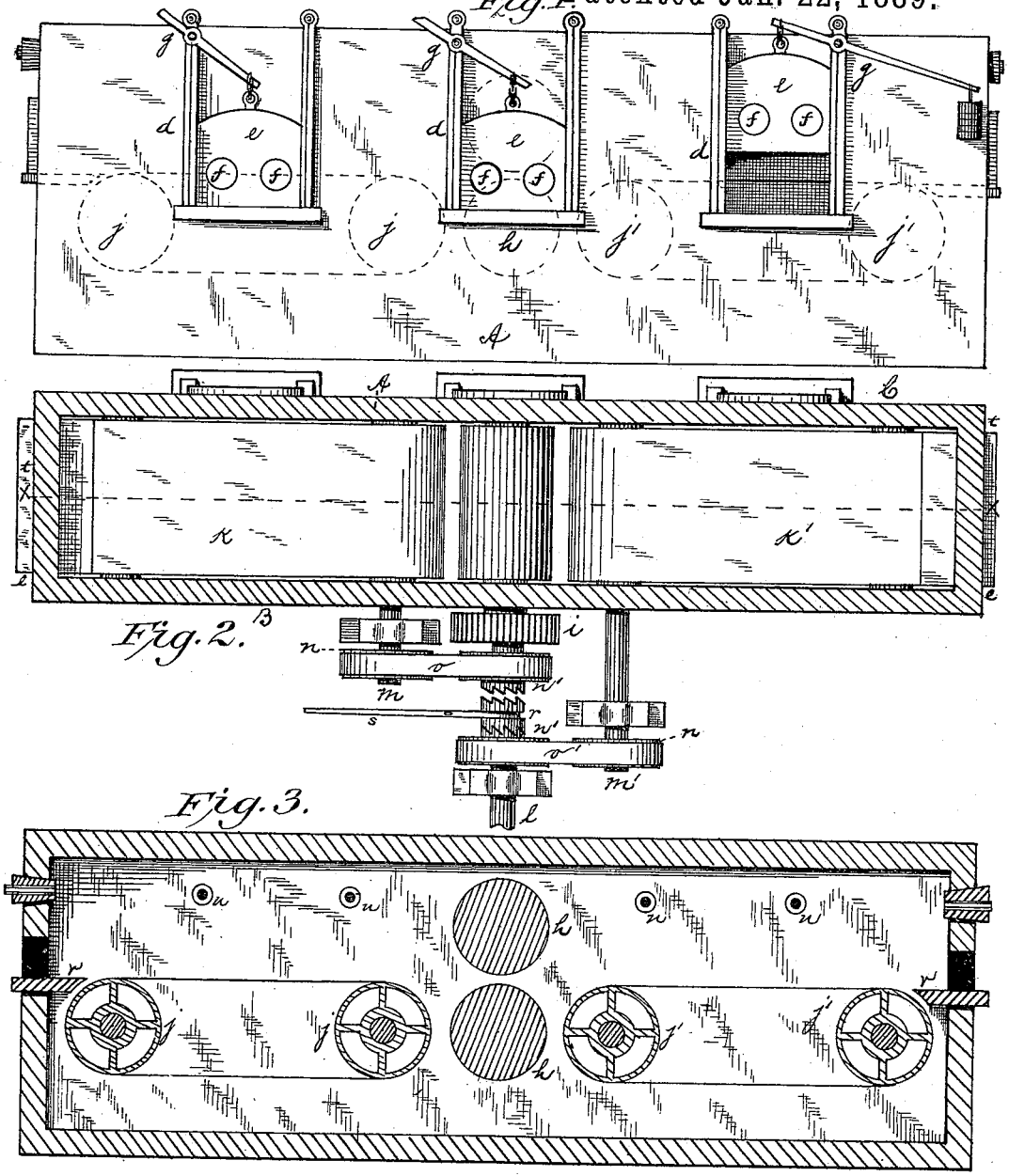

JACOB REESE, OF PITTSBURG, PENNSYLVANIA.

MANUFACTURE OF GLASS.

SPECIFICATION forming part of Letters Patent No. 396,512, dated January 22, 1889.

Application filed August 8, 1887. Serial No. 246,411. (No model.)

*To all whom it may concern:*

Be it known that I, JACOB REESE, a citizen of the United States, residing at Pittsburg, in the county of Allegheny and State of Pennsylvania, have invented a new and useful Improvement in the Manufacture of Glass; and I hereby declare the following to be a full, clear, and exact description of the invention, which will enable others skilled in the art to which it appertains to make and use the same.

This invention relates to a method of securing a uniform temperature to glass while being manufactured; also, to an improvement in furnaces and machinery for rolling window and plate glass. Heretofore window-glass has been made by blowing molten glass into a cylinder, then cutting off the ends, and then splitting the cylinder lengthwise and flattening it.

Plate-glass is made by depositing molten glass on a plate or table, then passing a roller over it, and then annealing, grinding, and polishing it. In blowing glass into cylinders, then trimming the ends off, splitting and flattening it there is a great loss of glass by the waste of the ends and cracking, and in making the plate-glass there is a great waste in defective ends and sides, in breakage caused by irregular contraction by the glass coming in contact with the cold plate and roll, and by the cooling action of the atmosphere. There is also great loss and expense in grinding, as the surface coming in contact with the plate is pitted and blotched by the contracting of the glass on the surface while the center of the plate is of a higher temperature, thus preventing a uniform contraction. Another difficulty of this method of making glass is that the irregular contraction of the glass induces internal strains, causing cracks and breakage when subjected to the least concussion.

This invention is designed to obviate these difficulties to a large degree; and it consists in a method of securing uniform temperature to glass while being manufactured. It also consists in the construction of a furnace or heating-chamber in combination with a rolling apparatus in such a manner that glass may be rolled into sheets, plates, or window-glass forms without subjecting the glass to the chilling effects of cold rolls or cold plates, or to the cooling action of the air. This is secured by placing the rolling machinery within the furnace or heating-chamber, thus keeping the rolls up to a uniform temperature with the glass being operated on, and keeping the cold air away from the glass, and also keeping the glass of a uniform temperature throughout, which will be more fully explained by the drawings, in which—

Figure 1 is a side elevation of my improved glass-rolling furnace. Fig. 2 is a ground plan of same. Fig. 3 is a longitudinal cross-section of same.

A is the front side of the furnace.

B is the back side of same.

C is the roof.

$d$ are door-frames.

$e$ are doors.

$f$ are glass windows to enable the workmen to see what is being done in the furnace without opening the doors.

$g$ are levers for opening the doors.

$h$ are the rolls.

$i$ are the pinions for driving the rolls.

$j\ j'$ are pulleys for carrying the endless belts $k\ k'$, which receive and deliver the glass into or from the rolls.

$l$ is the main shaft connecting with the lower roll, $h$.

$m\ m'$ are the shafts which connect with the pulleys $j\ j'$ in the furnace.

$n\ n'$ are pulleys which carrys the belts $o\ o'$, connecting the shafts $m\ m'$ with the main shaft $l$.

$r$ is a double crab for connecting or disconnecting the pulleys $m'$ with the main shaft $l$.

S is the lever by which the crab $r$ is operated. $t$ are the end doors through which the glass enters and passes out of the furnace. $u$ are gas-burners for heating the furnace.

In the practice of this improvement the furnace may be built of brick, or it may be made of steel or plate-iron. The rolls may be made of chilled iron, steel, or vulcanized rubber, or any material that will stand a temperature of 1,000° Fahrenheit, as no higher temperature need be maintained in the furnace at any time.

While my apparatus may be built of any dimension required to produce the largest sizes of plate-glass, still I shall now explain its construction suitable to produce window-glass twelve inches wide and of all lengths. The furnace should be one hundred and five feet in length, two feet in width, and about five feet in height. The furnace is heated by a series of gas-burners, (marked $u$.) At equidistance from the ends of the furnace is placed a pair of rolls, which may be made of any suitable size. I prefer to make them twelve inches in diameter and twenty inches long with eight-inch necks. The front ends of the rolls may have their bearings or journals inside of the furnace, or both may be in the walls of the furnace. The opposite ends of the rolls should project through the wall of the furnace, as shown in Fig. 2, and on these ends of the rolls are placed the pinions $i$ for driving the top roll. The shaft of the bottom roll, or a spindle attached to it, should extend farther out than that of the top roll. On this bottom spindle are placed two pulleys, $n'$, and a crab, $r$, which will be more fully explained hereinafter. The top roll is furnished with a balance, such as in ordinary use in plate-mills. The rolls are also furnished with the ordinary screws, riders, and carriages. (Not shown here.)

On each side of the rolls and near to them are placed the pulleys $j$, which are of cast-iron, about same diameter as the rolls and of same length. Parallel with them are placed two more of same kind of pulleys at each end of the furnace. Belts made of brass, iron, steel, or any suitable material are placed over and around the two pulleys $j\,j'$ on each side of the rolls. The belts may be soldered or riveted together. They should be about eighteen inches in width. The two end pulleys, $j\,j'$, are mounted on shafts, and may be journaled in the walls of the furnace or outside. The two pulleys nearest to the rolls are mounted on shafts, one end of which projects through the walls of the furnace, as shown at $m\,m'$ in Fig. 2, on the outer ends of which are attached the pulleys $n\,n$, which are connected with pulleys $n\,n'$ on the main shaft $l$ by the belts $o\,o'$.

The pulleys $n'\,n'$ are loose pulleys, and are put in motion by the main shaft $l$ by means of the crab $r$, which is fastened to the shaft $l$ by a slip key. Between the rolls $h$ and the pulleys $j\,j$ are placed guides, (not shown,) in order to convey the glass from the roll to the pulleys and from the pulleys to the roll. Guides $v$ are also placed at the ends, so as to convey the glass from the outside onto the belts or from the belts through the doors $t\,t$. In working heavy glass small pulleys may be placed between the rolls and the end of the furnace in order to hold up the belts $k$ and $k'$.

In the practice of this invention I construct the furnace and rolling apparatus as described, and heat it up to about 600° Fahrenheit by the combustion of natural gas or some other fuel. I then connect the shaft $l$ with the engine or driving power. I then charge a slab or plate of glass (by preference previously heated) into the furnace and put it on the belt $k$. When the glass has been adjusted to the lowest temperature at which it remains in a ductile or pliable state, the rolls $h$ are put in motion. The belt $k$ carries the glass into the rolls $h$, where its thickness is reduced, and it is delivered onto the belt $k'$. When the glass has passed through the rolls, the screws are tightened, the shaft $l$ reversed, and the crab $r$ changed so as to let belt $o$ run loose and drive belt $o'$. This will propel belt $k'$ toward the rolls and carry the glass into the rolls, where it will be reduced in thickness and deposited onto belt $k$, and thus by reversing the machinery the glass may be rolled from a slab three or four inches thick into window-glass; or, if it is desired, a sheet or plate of glass of one-half inch (more or less) in thickness may be rolled down to the thickness desired for window-glass.

In the use of this furnace great care should be had in keeping the doors closed. The roller should watch the operation within the furnace by looking through the glass openings $f$ in the doors E, and should never open the doors unless absolutely necessary, as it is highly desirable that the gases of combustion shall cause a plenum pressure in the furnace at all times while the glass is under treatment, so as to exclude the cold air from entering, as it would have a chilling effect on the glass, and, as the best results of this method of making window-glass are obtained by rolling the glass at the lowest temperature that it can be rolled, the cold air must be excluded, as it would chill the glass below its rolling temperature and cause it to crack and break in rolling. When the glass has been rolled to the desired thickness, it is run out of the furnace into an annealing-chamber and annealed. It may then be cut up and boxed ready for market.

Sheets or plates of glass of any width may be made by this apparatus by increasing the width of the furnace and the rolling apparatus.

When plate-glass is required, the slabs should be made thicker than when used for window-glass, so that the plate may be well rolled before being reduced to the desired thickness, and in rolling both window and plate glass great care should be taken to keep the temperature of the furnace at the lowest point at which the glass can be rolled, in order that the glass in the act of rolling may be thoroughly flattened. When the temperature is too high, the glass will not be properly flattened, and will require to be flattened in a separate furnace or flattening-oven.

It will be noticed that I show no stack to this furnace. The gas and air are forced in, or the gas is blown in through a nozzle, and thus carries sufficient air for combustion with it. This is done so as to secure a plenum pressure in the furnace at all times, and to exclude all air except what is needed for combustion of the gas. The excess gases will escape out of the furnace at the doors, and thus the hot glass will be always protected from the injurious influence of the chilling effect of cold air. When plate-glass is thus rolled at the lowest possible temperature, it will be found to possess a smooth flat surface, and will not require half the grinding necessary by glass made in the old way.

Plate-glass for skylights, floor, and side panels, for buildings, glass roofing, table-tops, and all such forms may be rolled with plane, figured, or corrugated surfaces by the use of suitable rolls.

The advantage of this invention is that window and plate glass may be rolled in large long sheets by machinery, being a great saving of labor, and a saving of glass, as the waste will be less by cutting from long lengths. There will be no bubbles in my glass, as the rolls will flatten them, and my window-glass will be of a uniform thickness, while blown glass is often of different thicknesses.

What I claim as my invention, and desire to secure by Letters Patent, is—

1. A plant for rolling glass, comprising a set of reducing-rolls inclosed within a chamber capable of being maintained at the temperature of ductility of the glass.

2. A plant for rolling glass, comprising a set of reducing-rolls provided with feeding-tables inclosed within a chamber capable of being maintained at the lowest temperature at which glass is ductile.

3. A plant for rolling glass, comprising a set of reducing-rolls inclosed within a chamber capable of being maintained at the lowest temperature that glass is ductile, in combination with mechanism for revolving said rolls.

JACOB REESE.

Witnesses:
WALTER REESE,
C. C. LEE.